(12) United States Patent
Sperle

(10) Patent No.: US 7,467,947 B2
(45) Date of Patent: Dec. 23, 2008

(54) EXTERNAL COURSE CATALOG UPDATES

(75) Inventor: Robin U. Sperle, Mannheim (DE)

(73) Assignee: SAP Aktiengesellschaft, Walldorf (DE)

( * ) Notice: Subject to any disclaimer, the term of this patent is extended or adjusted under 35 U.S.C. 154(b) by 249 days.

(21) Appl. No.: 11/258,591

(22) Filed: Oct. 24, 2005

(65) Prior Publication Data

US 2007/0122791 A1    May 31, 2007

(51) Int. Cl.
*G09B 7/00* (2006.01)

(52) U.S. Cl. .................................... 434/322

(58) Field of Classification Search ............ 434/322, 434/323, 350, 351, 353, 354, 362, 219
See application file for complete search history.

(56) References Cited

U.S. PATENT DOCUMENTS

| | | | |
|---|---|---|---|
| 5,008,853 A | 4/1991 | Bly et al. | |
| 5,310,349 A | 5/1994 | Daniels et al. | |
| 5,395,243 A | 3/1995 | Lubin et al. | |
| 5,788,508 A | 8/1998 | Lee et al. | |
| 5,820,386 A * | 10/1998 | Sheppard, II | 434/322 |
| 5,823,781 A | 10/1998 | Hitchcock et al. | |
| 5,881,315 A | 3/1999 | Cohen | |
| 6,011,949 A | 1/2000 | Shimomukai | |
| 6,014,134 A | 1/2000 | Bell et al. | |
| 6,091,930 A | 7/2000 | Mortimer et al. | |
| 6,099,320 A | 8/2000 | Papadopoulos | |
| 6,112,049 A | 8/2000 | Sonnenfeld | |
| 6,148,338 A | 11/2000 | Lachelt et al. | |
| 6,149,438 A | 11/2000 | Richard et al. | |
| 6,149,441 A | 11/2000 | Pellegrino et al. | |
| 6,162,060 A | 12/2000 | Richard et al. | |
| 6,164,974 A | 12/2000 | Carlile et al. | |
| 6,315,572 B1 | 11/2001 | Owens et al. | |
| 6,336,813 B1 | 1/2002 | Siefert | |
| 6,347,333 B2 | 2/2002 | Eisendrath et al. | |
| 6,347,943 B1 | 2/2002 | Fields et al. | |
| 6,368,110 B1 | 4/2002 | Koenecke et al. | |
| 6,370,355 B1 | 4/2002 | Ceretta et al. | |
| 6,381,444 B1 | 4/2002 | Aggarwal et al. | |
| 6,386,883 B2 * | 5/2002 | Siefert | 434/322 |
| 6,397,036 B1 | 5/2002 | Thean et al. | |

(Continued)

FOREIGN PATENT DOCUMENTS

GB    2373625 A    9/2002

OTHER PUBLICATIONS

Chappell, David, "*Asynchronous Web Services and the Enterprise Service Bus,*" May 6, 2002, 5 pgs. <http://www.webservices.org>, site visited Dec. 4, 2006.

(Continued)

*Primary Examiner*—Kurt Fernstrom
(74) *Attorney, Agent, or Firm*—Fish & Richardson P.C.

(57) ABSTRACT

In general, the disclosure includes course catalog updates. In one embodiment, a method includes identifying a course type in an internal course catalog. The internal course catalog is associated with a local learning management system. A request for a course that is associated with the course type and referenced in a remote course catalog is automatically transmitted to a remote learning management system. The remote learning management system is operable to provide a plurality of courses. Information associated with the course is received from the remote learning management system. The course is automatically generated in the internal course catalog using the received information.

25 Claims, 6 Drawing Sheets

U.S. PATENT DOCUMENTS

| | | |
|---|---|---|
| 6,398,556 B1 | 6/2002 | Ho et al. |
| 6,409,514 B1 | 6/2002 | Bull |
| 6,470,171 B1 | 10/2002 | Helmick et al. |
| 6,514,085 B2 | 2/2003 | Slattery et al. |
| 6,527,556 B1 | 3/2003 | Koskinen |
| 6,587,668 B1 | 7/2003 | Miller et al. |
| 6,606,480 B1 | 8/2003 | L'Allier et al. |
| 6,622,003 B1 | 9/2003 | Denious et al. |
| 6,633,742 B1 | 10/2003 | Turner et al. |
| 6,643,493 B2 | 11/2003 | Kilgore |
| 6,652,283 B1 * | 11/2003 | Van Schaack et al. ........ 434/236 |
| 6,662,003 B2 * | 12/2003 | Elder et al. .................. 455/333 |
| 6,674,992 B2 | 1/2004 | Helmick et al. |
| RE38,432 E | 2/2004 | Fai et al. |
| 6,709,330 B1 | 3/2004 | Klein et al. |
| 6,729,885 B2 | 5/2004 | Stuppy et al. |
| 6,802,054 B2 | 10/2004 | Faraj |
| 6,827,578 B2 | 12/2004 | Krebs et al. |
| 6,884,074 B2 | 4/2005 | Theilmann |
| 6,905,883 B1 * | 6/2005 | Olmstead .................... 434/236 |
| 6,978,115 B2 * | 12/2005 | Whitehurst et al. .......... 434/350 |
| 7,058,354 B2 * | 6/2006 | McCormick et al. ......... 434/350 |
| 7,110,989 B2 * | 9/2006 | Iemoto et al. .................. 706/14 |
| 7,237,189 B2 * | 6/2007 | Altenhofen et al. .......... 715/511 |
| 2001/0044728 A1 | 11/2001 | Freeman et al. |
| 2001/0047310 A1 | 11/2001 | Russell |
| 2002/0006603 A1 | 1/2002 | Peterson et al. |
| 2002/0042041 A1 | 4/2002 | Owens et al. |
| 2002/0061506 A1 | 5/2002 | Catten et al. |
| 2002/0138841 A1 | 9/2002 | Ward |
| 2002/0142278 A1 | 10/2002 | Whitehurst et al. |
| 2002/0174021 A1 | 11/2002 | Chu et al. |
| 2002/0188583 A1 | 12/2002 | Rukavina et al. |
| 2003/0013073 A1 | 1/2003 | Duncan et al. |
| 2003/0049593 A1 | 3/2003 | Parmer et al. |
| 2003/0073063 A1 | 4/2003 | Dattaray et al. |
| 2003/0073065 A1 | 4/2003 | Riggs |
| 2003/0082508 A1 | 5/2003 | Barney |
| 2003/0113700 A1 | 6/2003 | Simon |
| 2003/0129576 A1 | 7/2003 | Wood et al. |
| 2003/0151629 A1 | 8/2003 | Krebs et al. |
| 2003/0152899 A1 | 8/2003 | Krebs et al. |
| 2003/0152900 A1 | 8/2003 | Krebs et al. |
| 2003/0152901 A1 | 8/2003 | Altenhofen et al. |
| 2003/0152902 A1 | 8/2003 | Altenhofen et al. |
| 2003/0152904 A1 | 8/2003 | Doty, Jr. |
| 2003/0152905 A1 | 8/2003 | Altenhofen et al. |
| 2003/0157470 A1 | 8/2003 | Altenhofen et al. |
| 2003/0163784 A1 | 8/2003 | Daniel et al. |
| 2003/0175664 A1 | 9/2003 | Frangenheim et al. |
| 2003/0175676 A1 | 9/2003 | Theilmann et al. |
| 2003/0207245 A1 | 11/2003 | Parker |
| 2003/0211447 A1 | 11/2003 | Diesel et al. |
| 2003/0224339 A1 | 12/2003 | Jain et al. |
| 2004/0081951 A1 | 4/2004 | Vigue et al. |
| 2005/0202392 A1 | 9/2005 | Allen et al. |

OTHER PUBLICATIONS

Siekmann, Jörg et al., "Adaptive Course Generation and Presentation," ITS Workshop on Adaptive and Intelligent Web-Based Foundation System, Montreal, The Omega Group; pp. 1-10, 2000.

Lai Jin et al., "An Ontology-Aware Authoring Tool—Functional structure and guidance generation," Proceedings of AIED '99, pp. 85-92, LeManns France, 1999.

Dietrich, Albert et al., "Adaptive and Dynamic Hypertext Tutoring Systems Based on Knowledge Space Theory," AIED '97 Artificial Intelligence in Education, Amsterdam vol. 39 of Froulier in Artificial Intelligence and Application, 3 pgs., 1997.

Ranwez, Sylvie et al., "Description and Construction of Pedagogical Material using an Ontology based DTD," AIED '99 Workshop 2 proceedings "Ontologies for Intelligent Educational Systems", pp. 1-4, 1999.

Jungmann, Michael et al., "Adaptive Hypertext in Complex Information Spaces," Daimler-Benz Research & Technology, Technical University of Ilmenau, pp. 1-5, Mar. 8, 1997.

Henze, Nicola et al.,"Modeling Constructivist Teaching Functionality and Structure in the KBS Hyperbook System," University of Hannover, pp. 1-12, Jun. 4, 1999.

Mühlhäuser, Max , "Cooperative Computer-Aided Authoring and Learning," University of Karlsruhe, pp. 107-130, 145-161, 165-192, 273-291, 293-318, 1995.

Paaso, Professor Jouko , "A New Environment for Courseware Development, Course Delivery and Training," Proceedings of the ED-Media 97, Toronto, 1997, 10 pages.

Sun Microsystems, "Developing Web Services with SUN™ Open Network Environment," Mar. 2002, [online], [retrieved from the Internet Mar. 24, 2004: http:wwws.sun.com/software/sunone/wp-spine/spine.pdf], pp. 1-32, XP002274909.

Trythall, Steve, "JMS and CORBA Notification Interworking," Dec. 12, 2001, [online], [retrieved from the Internet Mar. 24, 2004: http://www.onjava.com/pub/a/onjava/2001/12/12/jms_not.html], 8 pgs., XP002274907.

Lipkin, Daniel, "Universal Learning Format Technical Specification," Jan. 13, 2001, retrieved from the Internet on Jul. 29, 2004, at http://xml.coverpages.org/ulf.html, XP002290517, pp. 1-3.

x.hlp, "Software for faster learning," http://www.xhlp.com/home.cfm, Apr. 2003, 7 pgs.

Global Knowledge Network, Inc., "On Demand Personal Navigator," http://kp.globalknowledge.com/products/od/index.asp, Sep. 2002, 2 pgs.

Hewlett Packard, "HP OpenView Integration Guide for Developers," Jul. 2002, [online], [retrieved from the Internet on Mar. 24, 2004: http://h21007.www2.hp.com/dspp/files/unprotected/OpenView/IntegrationGuide/OV_Integration_Guide_7_30.pdf], pp. 67-92, XP002274908.

Hewlett Packard, "hp OpenView Service Navigator for hp OpenView Operations 7.x for UNIX Product Brief," May 2002, [online], [retrieved from the Internet on Mar. 24, 2004: http://www.pervigil.com/PDF/HP/sernav_pb_jun02.pdf], 2 pgs., XP002274906.

* cited by examiner

_US 7,467,947 B2_

EXTERNAL COURSE CATALOG UPDATES

TECHNICAL FIELD

This disclosure relates to course scheduling and, more particularly, to external course catalog updates.

BACKGROUND

Today, an enterprise's survival in local or global markets at least partially depends on the knowledge and competencies of its employees, which may easily be considered a competitive factor for the enterprises (or other organizations). Shorter product life cycles and the speed with which the enterprise can react to changing market requirements are often important factors in competition and ones that underline the importance of being able to convey information on products and services to employees as swiftly as possible. Moreover, enterprise globalization and the resulting international competitive pressure are making rapid global knowledge transfer even more significant. Thus, enterprises are often faced with the challenge of lifelong learning to train a (perhaps globally) distributed workforce, update partners and suppliers about new products and developments, educate apprentices or new hires, or set up new markets. In other words, efficient and targeted learning is a challenge that learners, employees, and employers are equally faced with. But traditional classroom training typically ties up time and resources, takes employees away from their day-to-day tasks, and drives up expenses. Many companies may not have the resources to develop and administer training and/or educational services to employees and, thus, rely on third-party providers to provide the necessary training and/or education. Accordingly, these companies must identify such providers and also identify courses that are relevant to their employees, which can be time consuming and costly.

SUMMARY

In general, the disclosure includes course catalog updates. In one embodiment, a method includes identifying a course type in an internal course catalog. The internal course catalog is associated with a local learning management system. A request for a course that is associated with the course type and referenced in a remote course catalog is automatically transmitted to a remote learning management system. The remote learning management system is operable to provide a plurality of courses. Information associated with the course is received from the remote learning management system. The course is automatically generated in the internal course catalog using the received information.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
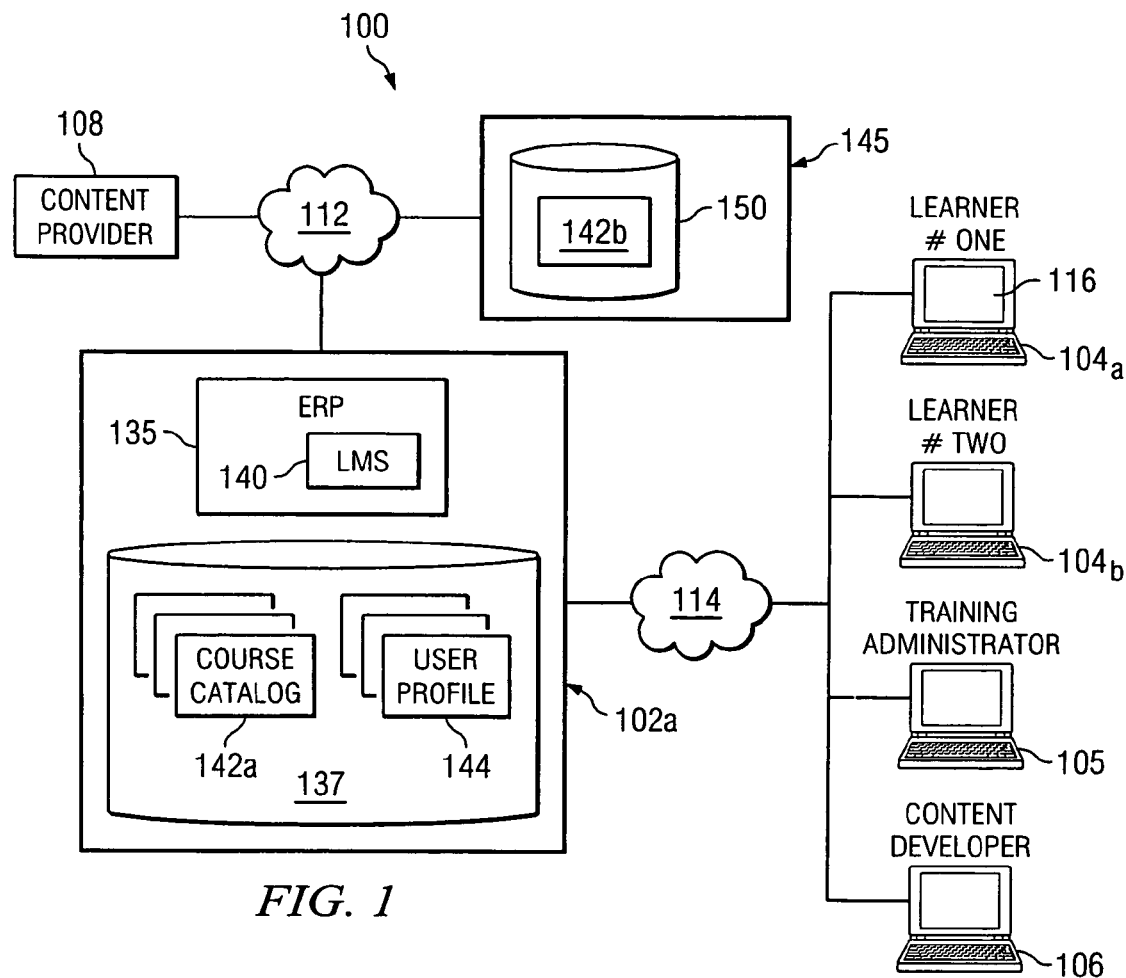
FIG. 1 is a diagram illustrating an example learning environment according to one embodiment of the present disclosure.

FIG. 1 illustrates an example environment for a learning management system 140 that may deliver a blended learning solution of learning methods used in traditional classroom training, web-based training, and virtual classrooms. At a high level, such applications 140 provide convenient information on the learner 104's virtual workplace and at least partially control the learning process itself. The system proposes learning units based on the learner 104's personal data, tracks progress through courses and coordinates the personalized learning experience. In addition, learning management system 140 encompasses the administrative side of the learning platform, where a training administrator 105 structures and updates the offering and distributes it among the target groups. Moreover, the course offering is usually not restricted to internally hosted content. The learning management system 140 often offers robust reporting capabilities, including ad hoc reporting and business intelligence. These capabilities may provide in-depth analysis of the entire business or organization, thereby enabling better decision making. For example, learning management systems 140 may implement techniques that reduce, minimize, or eliminate inconsistencies between learning management system 140 and external management system 145. In addition, learning management systems 140 may perform such process automatically without need direct administrative interaction thereby saving time or money. Learning management system 140 typically helps improve the quality of training and cut costs by reducing the travel and administrative costs associated with classroom training while delivering a consistent learning offering. Training administrators 105 may customize teaching scenarios by using web services to integrate external content, functions, and services into the learning platform from a remote or third party content provider 108 or an external (or remote) learning management system 145, typically (but not always) provided by a third party. For example, internal learning management system 140 may reside within a particular enterprise while external learning management system 145, in contrast, may reside within in a different enterprise and communication between the two is across a network such as network 112. As a result, external learning management system 145 may provide training services over network 112 to internal learning management system 140 regardless of the physical separation between them.

The training administrator 105 can administer internal and external participants (or learners 104) and enroll them for courses to be delivered via any number of techniques. Training management supports the respective organization, entity, or learner 104 in the day-to-day activities associated with course bookings. Booking activities can be performed by the training administrator in training management on an individual or group participant basis. For example, training administrator 105 can often request, execute, or otherwise manage the following activities in a dynamic participation menu presented in learning management system 140: i) prebook: if participants are interested in taking certain classroom courses or virtual classroom sessions, but there are no suitable dates scheduled, learners 104 can be prebooked for the course types. Prebooking data can be used to support a demand planning process; ii) book: individual or group learners 104 (for example, companies, departments, roles, or other organizational units) can be enrolled for courses that can be delivered using many technologies; iii) rebook: learners 104 can book a course on an earlier or later date than originally booked; iv) replace: learners 104 can be swapped; and v) cancel: course bookings can be canceled, for example, if the learners 104 cannot attend.

Environment 100 is typically a distributed client/server system that spans one or more networks such as external network 112 or internal network 114. In such embodiments, data may be communicated or stored in an encrypted format such as, for example, using the standard TNG encryption algorithm. But environment 100 may be in a dedicated enterprise environment—across a local area network or subnet— or any other suitable environment without departing from the scope of this disclosure. Indeed, while generally described or referenced in terms of an enterprise, the components and techniques may be implemented in any suitable environment, organization, entity, and such. Turning to the illustrated embodiment, environment 100 includes or is communicably coupled with server 102*a*, one or more learners 104 or other users on clients, and network 112. In this embodiment, environment 100 is also communicably coupled with external content provider 108 and external learning management system 145 via external network 112.

Internal server 102 comprises an electronic computing devices operable to receive, transmit, process and store data associated with environment 100. Generally, FIG. 1 provides merely one example of computers that may be used with the disclosure. Each computer is generally intended to encompass any suitable processing device. For example, although FIG. 1 illustrates internal server 102 that may be used with the disclosure, environment 100 can be implemented using computers other than servers, as well as a server pool. Indeed, server 102 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 102 may be adapted to execute any operating system including Linux, UNIX, Windows Server, or any other suitable operating system. According to one embodiment, server 102 may also include or be communicably coupled with a web server and/or a mail server. Server 102 may also be communicably coupled with a remote repository over a portion of network 112. While not illustrated, the repositories may be any intra-enterprise, inter-enterprise, regional, nationwide, or other electronic storage facility, data processing center, or archive that allows for one or a plurality of clients (as well as server 102) to dynamically store data elements, which may include any business, enterprise, application or other transaction data. For example, the repository may be a central database communicably coupled with one or more servers 102 and clients via a virtual private network (VPN), SSH (Secure Shell) tunnel, or other secure network connection. This repository may be physically or logically located at any appropriate location including in one of the example enterprises or off-shore, so long as it remains operable to store information associated with environment 100 and communicate such data to at least a subset of plurality of the clients (perhaps via server 102).

As a possible supplement to or as a portion of this repository, server 102 normally includes some form of local memory 137. Memory 137 may include any memory or database module and may take the form of volatile or non-volatile memory including, without limitation, magnetic media, optical media, random access memory (RAM), read-only memory (ROM), removable media, or any other suitable local or remote memory component. For example, memory 137 may store or reference a large volume of information relevant to the planning, management, and follow-up of courses or other content. This example data includes information on i) course details, such as catalog information, dates, prices, capacity, time schedules, assignment of course content, and completion times; ii) personnel resources, such as trainers who are qualified to hold courses; iii) room details, such as addresses, capacity, and equipment; and iv) participant data for internal and external participants. Memory 137 may also include any other appropriate data such as VPN applications or services, firewall policies, a security or access log, print or other reporting files, HTML files or templates, data classes or object interfaces, child software applications or sub-systems, and others. In the illustrated embodiment, memory 137 includes local course catalog 142*a* and user profiles 144.

Course catalog 142 includes one or more entries or data structures operable to identify courses that a user may enroll in and associated aspects of the courses. Aspects may include attributes (e.g., location dependent, schedule dependent), specific checkings (e.g., personal shift schedule, capacity), available actions (e.g., billing, cancellation conditions), and/or other suitable aspects of a course. The courses may be provided directly by local application 140, external management system 145, content provider 108, or other suitable sources. Generally, the course catalog 142 includes one or more of the following for each available course: title, course ID (internal or external), access, course type, capacity, schedule, location, billing procedures, cancellation procedures, delivery method, enrolled users, and/or other aspects. In the event that a course is provided by external management system 145, course catalog 142 includes an information operable to identify external management system 145 and how to transmit associated information and/or request. In some embodiments, course catalog 142 includes information indicating specific checks that may be performed for a course. For instances, course catalog 142 may indicate inquiries that may be made as to a course such as whether the course has been rescheduled, its current capacity, if it has a valid license, or others. As to delivery method, course catalog 142 may indicate that the delivery method is one. or more of the following: a classroom, a virtual classroom, a web-based training, an online test, a curriculum, a static web-based training, an external web-based training, an external classroom, an external virtual classroom, an external online test, or others. Course catalog 142 may store information as one or more tables in a relational database described in terms of SQL statements or scripts. In another embodiment, the memory may store information as various data structures in text files, eXtensible Markup Language (XML) documents, Virtual Storage Access Method (VSAM) files, flat files, Btrieve files, comma-separated-value (CSV) files, internal variables, or one or more libraries. But any stored information may comprise one table or file or a plurality of tables or files stored on one computer or across a plurality of computers in any appropriate format. Indeed, some or all of the learning or content data may be local or remote without departing from the scope of this disclosure and store any type of appropriate data.

User profiles 144 includes one or more entries or data structures operable to identify courses associated with an individual as well as statuses of each course. For example, user profile 144 may indicate that a user is enrolled both internal and external courses as well as their current results or progress in the courses. A status of a course may indicate a step, an activity, progress, a result, or other information associated with the user's participation in the course. In any case, user profile 144 may include information associated with a user such as name, address, past courses, past results, current courses, current progress, billing information, or other suitable information associated with the user. Each user profile 144 may be associated with a different individual or a plurality of individuals or a plurality of user profiles 144 may be associated with a single individual. User profile 144 may be any suitable format such as, for example, a text file, binary file, an XML document, a flat file, a comma-separated-value (CSV) file, a name-value pair file, a Structured Query Language (SQL) table, one or more libraries, or others. User profile 144 may be dynamically created or populated by server 102, a third-party vendor, any suitable user of server 102, loaded from a default file, or received via network 112 or 114. The term "dynamically" as used herein, generally means that the appropriate processing is determined at run-time based upon the appropriate information. In addition, user profiles 114a may be created, deployed, and maintained independently of user profiles 114b.

Server 102 also includes one or more processors. Each processor executes instructions and manipulates data to perform the operations of server 102 such as, for example, a central processing unit (CPU), a blade, an application specific integrated circuit (ASIC), or a field-programmable gate array (FPGA). Although this disclosure typically discusses computers in terms of a single processor, multiple processors may be used according to particular needs and reference to one processor is meant to include multiple processors where applicable. In the illustrated embodiment, the processor executes enterprise resource planning (ERP) solution 135, thereby providing organizations with the strategic insight, ability to differentiate, increased productivity, and flexibility they need to succeed. With software such as ERP solution 135, the implementing entity may automate end-to-end processes and extend those processes beyond the particular organization to the entire system by incorporating customers, partners, suppliers, or other entities. For example, ERP solution 135 may include or implement easy-to-use self-services and role-based access to information and services for certain users, thereby possibly boosting productivity and efficiency. In another example, ERP solution 135 may include or implement analytics that enable the particular entity or user to evaluate performance and analyze operations, workforce, and financials on an entity and individual level for strategic and operational insight. ERP solution 135 may further include or implement i) financials to control corporate finance functions while providing support for compliance to rigorous regulatory mandates; ii) operations to support end-to-end logistics for complete business cycles and capabilities that improve product quality, costs, and time to market; and/or iii) corporate services to optimize both centralized and decentralized services for managing real estate, project portfolios, business travel, environment, health and safety, and quality. In the illustrated embodiment, ERP solution 135 also includes or implements some form of human capital management (in this case, learning) to maximize the profitability or other measurable potential of the users, with support for talent management, workforce deployment, and workforce process management. In certain cases, ERP solution 135 may be a composite application that includes, execute, or otherwise implement some or all of the foregoing aspects, which include learning management system 140 as illustrated.

As briefly described above, learning management system 140 is any software operable to provide a comprehensive enterprise learning platform capable of managing and integrating business and learning processes and supporting all methods of learning, not restricted to e-learning or classroom training. As described in more detail in FIG. 2, learning management system 140 is often fully integrated with ERP solution 135 and includes an intuitive learning portal and a powerful training and learning management system, as well as content authoring, structuring, and management capabilities. Learning management system 140 offers back-office functionality for competency management and comprehensive assessment for performance management, and offers strong analytical capabilities, including support for ad hoc reporting. The solution uses a comprehensive learning approach to deliver knowledge to all stakeholders, and tailors learning paths to an individual's educational needs and personal learning style. Interactive learning units can be created with a training simulation tool that is also available.

Further, learning management system 140 may be operable to integrate courses from an external course catalog 142b into internal course catalog 142a and provide services associated with the external courses. For example, learning management system 140 may transmit a request for specific course types to external management system 145. In other words, learning management system 140 may transmit a request inquiring as to whether a specific course type has been created and incorporated in external course catalog 142b. In the illustrated embodiment, external management system 145 includes an external repository such that external course catalog 142b resides in external repository 150. Accordingly, external repository 150 may provide a storage facility for external management system 145 that stores external courses and associated course information. In the event that learning management system 140 receives a message confirming such a course, learning management system 140 generates the course and may include the external course ID and incorporates the external course into local course catalog 142a. In addition, learning management system 140 may perform additional operations with external course catalog 142b such as updating (e.g., rescheduling), deleting, or others. In some embodiments, these operations are performed by transmitting a request to external management system 145 to perform the operation on external course catalog 142b. In this case, internal course catalog 142a may not updated to reflect the operations until a confirmation message is received from external management system 145. As a result, environment 100 may reduce, minimize, or eliminate inconsistencies between internal course catalog 142a and external course catalog 142b. In the course of inquiring as to whether a course type has been created in external management system 145, learning management system 140 may also determine an associated delivery method of the external course (e.g., web-based training, classroom, virtual classroom, static classroom, static web based training, test, curricula). In this case, learning management system 140 may also determine aspects of the delivery method such as attributes, specific checkings, available operations, or others. The delivery method and the associated aspects of the external course may be integrated into the internal course catalog 142a. Aside from integrating external courses into internal course catalog 142a, learning management system 140 may also provide operations to specific users with regarding to external courses. For example, learning management system 140 may provide enrollment services, billing services, cancellation services, progress evaluations, or others. In some embodiments, learning management system 140 inserts a flag in a user profile 144 associated with the user so learning management system 140 transmits a request to external management system 145 for information regarding the user's progress in the external course. This process may be in response to any suitable events such as the learner accessing an external course, expiration of an interval, a request by a user, or others. In the case that tracking information is received, learning management system 140 updates the associated user profile 144 with the tracking information or information based, at least in part, on the tracking information. The tracking information associated with the external course may be requested when the learner launches an external course, quits an external course, completes an external course, or other activity associated with the learner. Learning management system 140 may also provide a batch report which may schedule an overnight run to request tracking information associated with the learner. Simply, user profile 144 may be updated with tracking information associated with external courses.

Regardless of the particular implementation, "software" may include software, firmware, wired or programmed hardware, or any combination thereof as appropriate. Indeed, ERP solution 135 may be written or described in any appropriate computer language including C, C++, Java, J#, Visual Basic, assembler, Perl, any suitable version of 4GL, as well as others. For example, returning to the above described composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while ERP solution 135 is illustrated in FIG. 1 as including one sub-module learning management system 140, ERP solution 135 may include numerous other sub-modules or may instead be a single multi-tasked module that implements the various features and functionality through various objects, methods, or other processes. Further, while illustrated as internal to server 102, one or more processes associated with ERP solution 135 may be stored, referenced, or executed remotely. For example, a portion of ERP solution 135 may be a web service that is remotely called, while another portion of ERP solution 135 may be an interface object bundled for processing at the remote client. Moreover, ERP solution 135 and/or learning management system 140 may be a child or sub-module of another software module or enterprise application (not illustrated) without departing from the scope of this disclosure.

Server 102 may also include an interface for communicating with other computer systems, such as the clients, over networks, such as 112 or 114, in a client-server or other distributed environment. In certain embodiments, server 102 receives data from internal or external senders through the interface for storage in the memory and/or processing by the processor. Generally, the interface comprises logic encoded in software and/or hardware in a suitable combination and operable to communicate with networks 112 or 114. More specifically, the interface may comprise software supporting one or more communications protocols associated with communications network 112 or hardware operable to communicate physical signals.

Network 112 facilitates wireless or wireline communication between computer server 102 and any other local or remote computers, such as clients 104. Network 112, as well as network 114, facilitates wireless or wireline communication between computer server 102a and any other local or remote computer, such as local or remote clients, a remote content provider 108, or external learning management system 145. While the following is a description of network 112, the description may also apply to network 114, where appropriate. For example, while illustrated as separate networks, network 112 and network 114 may be a continuous network logically divided into various sub-nets or virtual networks without departing from the scope of this disclosure. In some embodiments, network 112 includes access points that are responsible for brokering exchange of information between the clients. As discussed above, access points may comprise conventional access points, wireless security gateways, bridges, wireless switches, sensors, or any other suitable device operable to receive and/or transmit wireless signals. In other words, network 112 encompasses any internal or external network, networks, sub-network, or combination thereof operable to facilitate communications between various computing components in system 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations. Turning to network 114, as illustrated, it may be all or a portion of an enterprise or secured network. In another example, network 114 may be a VPN between server 102a and a particular client across wireline or wireless links. In certain embodiments, network 114 may be a secure network associated with the enterprise and certain local or remote clients.

Each client is any computing device operable to connect or communicate with server 102 or other portions of the network using any communication link. At a high level, each client includes or executes at least GUI 116 and comprises an electronic computing device operable to receive, transmit, process and store any appropriate data associated with environment 100. It will be understood that there may be any number of clients communicably coupled to server 102. Further, "client" and "learner," "administrator," "developer" and "user" may be used interchangeably as appropriate without departing from the scope of this disclosure. Moreover, for ease of illustration, each client is described in terms of being used by one user. But this disclosure contemplates that many users may use one computer or that one user may use multiple computers. As used in this disclosure, the client is intended to encompass a personal computer, touch screen terminal, workstation, network computer, kiosk, wireless data port, smart phone, personal data assistant (PDA), one or more processors within these or other devices, or any other suitable processing device or computer. For example, the client may be a PDA operable to wirelessly connect with external or unsecured network. In another example, the client may comprise a laptop that includes an input device, such as a keypad, touch screen, mouse, or other device that can accept information, and an output device that conveys information associated with the operation of server 102 or other clients, including digital data, visual information, or GUI 116. Both the input device and output device may include fixed or removable storage media such as a magnetic computer disk, CD-ROM, or other suitable media to both receive input from and provide output to users of the clients through the display, namely the client portion of GUI or application interface 116.

GUI 116 comprises a graphical user interface operable to allow the user of the client to interface with at least a portion of environment 100 for any suitable purpose, such as viewing application or other transaction data. Generally, GUI 116 provides the particular user with an efficient and user-friendly presentation of data provided by or communicated within environment 100. As shown in later figures, GUI 116 may comprise a plurality of customizable frames or views having interactive fields, pull-down lists, and buttons operated by the user. GUI 116 may be a learning interface allowing the user or learner 104 to search a course catalog, book and cancel course participation, and support individual course planning (e.g., by determining qualification deficits and displaying a learner's completed, started, and planned training activities). Learner 104 also may access and work through web based courses using the learning interface. The learning interface may be used to start a course, reenter a course, exit a course, and take tests. The learning interface also provides messages, notes, and special course offerings to the learner 104. GUI 116 may also be a course editor allowing the content developer to create the structure for the course content, which may be saved as metadata. The metadata may be interpreted by a content player of learning management system 140 (described below) to present a course to learner 104 according to a learning strategy selected at run time. In particular, the course editor may enable the author or content developer 106 to classify and describe structural elements, assign attributes to structural elements, assign relations between structural elements, and build a subject-taxonomic course structure. The course editor generates the structure of the course and may include a menu bar, a button bar, a course overview, a dialog box, and work space. The menu bar may include various drop-down menus, such as, for example, file, edit, tools, options, and help. The drop-down menus may include functions, such as create a new course, open an existing course, edit a course, or save a course. The button bar may include a number of buttons. The buttons may be shortcuts to functions in the drop down menus that are used frequently and that activate tools and functions for use with the course editor. The remaining portions of the example course editor interface may be divided in to three primary sections or windows: a course overview, a dialog box, and a workspace. Each of the sections may be provided with horizontal or vertical scroll bars or other means allowing the windows to be sized to fit on different displays while providing access to elements that may not appear in the window.

GUI 116 may also present a plurality of portals or dashboards. For example, GUI 116 may display a portal that allows users to view, create, and manage historical and real-time reports including role-based reporting and such. Generally, historical reports provide critical information on what has happened including static or canned reports that require no input from the user and dynamic reports that quickly gather run-time information to generate the report. Of course, reports may be in any appropriate output format including PDF, HTML, and printable text. It should be understood that the term graphical user interface may be used in the singular or in the plural to describe one or more graphical user interfaces and each of the displays of a particular graphical user interface. Indeed, reference to GUI 116 may indicate a reference to the front-end or other component of learning management system 140, as well as the particular interface or learning portal accessible via client, as appropriate, without departing from the scope of this disclosure. In short, GUI 116 contemplates any graphical user interface, such as a generic web browser or touch screen, that processes information in environment 100 and efficiently presents the results to the user. Server 102 can accept data from the client via the web browser (e.g., Microsoft Internet Explorer or Netscape Navigator) and return the appropriate HTML or XML responses to the browser using network 112 or 114, such as those illustrated in subsequent figures.

In aspect of operation for integrating external courses with learning management system 140, learning management system 140 transmits a creation request to external management system 145 via network 112 for a course type. For example, the course type may include a subject (e.g., Calculus) and a level associated with a subject (e.g., Vector Calculus). After receiving their creation request, external management system 145 identifies the course type and determines that external catalog 142b includes such a course or create such a course if it does not exist. In response to identifying the course, external management system 145 transmits a confirmation message to internal learning management system 140. The confirmation message may include a delivery method associated with external course ID, and/or other aspects of the external course. Local management system 140 may use aspects of the external course base, at least in part, on the delivery method. For example, the aspects may include attributes, specific checking, and/or available operations. In response to at least the confirmation message, local learning management system 140 generates the course based, at least in part, on the confirmation message and/or information generated from the confirmation message and integrates the external course into internal course catalog 142a. In the event that learner 104 wants to cancel an external course, learning management system 140 identifies the external course in internal course catalog 142a using any of the associated aspects. In particular, learning management system 140 determines whether the external course may be canceled and, if so, determines what criteria must be met in order to cancel the external course. For instance, the course catalog 142a may indicate that the external course may not be canceled after a particular date, if the learner's progress is below a particular threshold, or other criteria. During the external course, learning management system 140 may receive tracking information from external management system 145 regarding the learner's progress, step, activity, and/or results. Learning management system 140 may use the tracking information to update the associated user protocol 144 and, as a result, may maintain consistency between the two learning systems 140 and 145.

Figure 2:
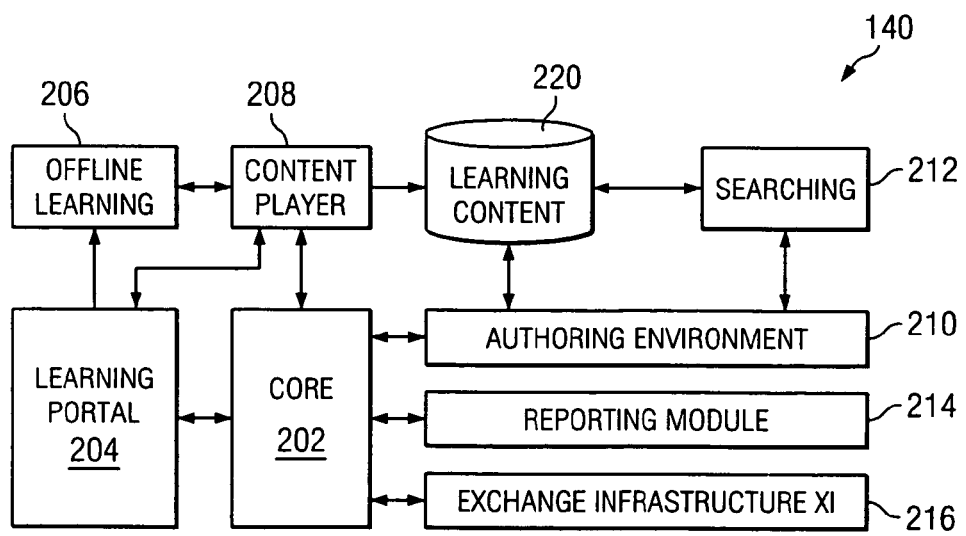
FIG. 2 illustrates an example architecture of a learning management system implemented within the learning environment of FIG. 1.

FIG. 2 illustrates one example implementation of learning management system (LMS) 140. In the illustrated embodiment, LMS 140 comprises four example components, namely i) a management system core 202, which controls learning processes and manages and handles the administrative side of training; ii) a learning portal 204, which is the learner's springboard into the learning environment, which allows him to access the course offering and information on personal learning data and learning activities; iii) an authoring environment 210, where learning content and tests are designed and structured; and iv) a content management system 220, where learning content is stored and managed. Generally, LMS 140 is aimed at learners 104, trainers 105, course authors 106 and instructional designers, administrators, and managers.

Learners 104 log on to their personalized learning portal 204 from the client via GUI 116. The learning portal 204 is the user's personalized point of access to the learning-related functions. Generally, learning portal 204 presents details of the complete education and training offering, such as traditional classroom training, e-learning courses (such as virtual classroom sessions or web-based training), or extensive curricula. Self-service applications enable learners 104 to enroll themselves for courses, prebook for classroom courses, and cancel bookings for delivery methods, as well as start self-paced learning units directly. If learner 104 wants to continue learning offline, he can often download the courses onto the client and synchronize the learning progress later. The learning portal 204 may be seamlessly integrated in an enterprise portal, where learner 104 is provided with access to a wide range of functions via one system. Such an enterprise portal may be the learner's single point of entry and may integrate a large number of role-based functions, which are presented to the user in a clear, intuitive structure. The learning portal 204 often gives learner 104 access to functions such as, for example, search for courses using i) find functions: finding courses in the course catalog that have keywords in the course title or description; and ii) extended search functions: using the attributes appended to courses, such as target group, prerequisites, qualifications imparted, or delivery method. Additional functions may include self-service applications for booking courses and canceling bookings, messages and notes, course appraisals, and special (or personalized) course offering including courses prescribed for the learner 104 on the basis of his or her role in the enterprise or the wishes of the respective supervisor or trainer and qualification deficits of learner 104 that can be reduced or eliminated by participating in the relevant courses. The learning portal 204 may also provide a view of current and planned training activities, as well as access to courses booked, including: i) starting a course; ii) reentering an interrupted course; iii) downloading a course and continuing learning offline; iv) going online again with a downloaded course and synchronizing the learning progress; v) exiting a course; and vi) taking a test.

On the basis of the information the learning management system 140 has about learner 104, the learning management system core 202 proposes learning units for the learner 104, monitors the learner's progress, and coordinates the learner's personal learning process. In addition, the learning management system core 202 is often responsible for managing and handling the administrative processes. Targeted knowledge transfer may use precise matching of the learning objectives and qualifications of a learning unit with the learner's level of knowledge. For example, at the start of a course, the management system core 202 may compare learning objectives already attained by the respective learner 104 with the learning objectives of the course. On the basis of this, core 202 determines the learner's current level and the required content and scope of the course. The resulting course is then presented to the learner 104 via a content player 208.

The content player 208 is a virtual teacher that tailors learning content to the needs of the individual learner 104 and helps him navigate through the course; content player 208 then presents the learning course to the learner 104. In certain embodiments, the content player 208 is a Java application that is deployed on a Java runtime environment, such as J2EE. In this case, it is linked with other systems such as a web application server and ERP solution 135 via the Java Connector. The individual course navigation may be set up at runtime on the basis of the learning strategy stored in the learner account. Using the didactical strategies, content player 208 helps ensure that the course is dynamically adapted to the individual learning situation and the preferences expressed by learner 104. At this point, the content player 208 then calculates dynamically adjusted learning paths and presents these to the learner 104—perhaps graphically—to facilitate orientation within a complex subject area. The learner 104 can resume working on an interrupted course at any time. At this point, the content player 208 guides the learner 104 to the spot at which training was interrupted.

The offline player 206 generally enables learners 104 to download network or other web-based courses from the learning portal 204 and play them locally. Locally stored courses are listed in the course list with an icon indicating the status of each course. The offline player 206 may guide the learner 104 through the course according to the preferred learning strategy. It may also dynamically adjust the number and sequence of learning objects to the learner's individual learning pattern. If the learner 104 interrupts a course, the offline player 206 reenters the course at the point of interruption the next time. The learner 104 can, at any point in time, resynchronize his offline learning progress with the learning portal 204 and either continue learning online or set the course to a completed status.

LMS core 202 may also include or invoke training management that would be an administrative side of LMS 140. This typically includes course planning and execution, booking and cancellation of course participation, and follow-up processing, including cost settlement. In training management, the training administrator 105 creates the course offering and can, for example, define training measures for individual learners 104 and groups of learners 104. The training administrator 105 creates the course catalog in training management and makes it available (partially or completely) to learners 104 in the learning portal 204 for reference and enrollment purposes. The training administrator 105 can typically administer internal and external participants and enroll them for courses to be delivered using various technologies and techniques. Training management supports numerous business processes involved in the organization, management, and handling of training. Training management can be configured to meet the requirements, work processes, and delivery methods common in the enterprise. Training measures are usually flexibly structured and may include briefings, seminars, workshops, virtual classroom sessions, web-based trainings, external web-based trainings, static web courses, or curricula. Training management includes functions to efficiently create the course offerings. Using course groups to categorize topics by subject area enables flexible structuring of the course catalog. For example, when training administrator 105 creates a new subject area represented by a course group, he can decide whether it should be accessible to learners 104 in the learning portal 202.

Reporting functions 214 in training management enable managers to keep track of learners' learning activities and the associated costs at all times. Supervisors or managers can monitor and steer the learning processes of their employees. They can be notified when their employees request participation or cancellation in courses and can approve or reject these requests. LMS 140 may provide the training manager with extensive support for the planning, organization, and controlling of corporate education and training. Trainers need to have up-to-the-minute, reliable information about their course schedules. There is a wide range of reporting options available in training management to enable the trainer to keep track of participants, rooms, course locations, and so on.

Authoring environment 210 contains tools and wizards that content develops 106 and instructional designers can use to create or import external course content. External authoring tools can be launched directly via authoring environment 210 to create learning content that can be integrated into learning objects and combined to create complete courses (learning nets). Attributes may be appended to content, thereby allowing learners 104 to structure learning content more flexibly depending on the learning strategy they prefer. Customizable and flexible views allow subject matter experts and instructional designers to configure and personalize the authoring environment 210. To create the HTML pages for the content, the user can easily and seamlessly integrate editors from external providers or other content providers 108 into LMS 140 and launch the editors directly from the authoring environment 210. The authoring environment often includes a number of tools for creating, structuring, and publishing course content and tests to facilitate and optimize the work of instructional designers, subject matter experts, and training administrators 105. Authoring environment 210 may contain any number of components or sub-modules such as an instructional design editor is used by instructional designers and subject matter experts to create and structure learning content (learning nets and learning objects), a test author is used by instructional designers and subject matter experts to create web-based tests, and a repository explorer is for training administrators and instructional designers to manage content.

In the illustrated embodiment, course content is stored and managed in the content management system 220. Put another way, LMS 140 typically uses the content management system 220 as its content storage location. But a WebDAV (Web-based Distributed Authoring and Versioning) interface (or other HTTP extension) allows integration of other WebDAV-enabled storage facilities as well without departing from the scope of this disclosure. Content authors or developers 106 publish content in the back-end training management system. Links to this content assist the training administrator 105 in retrieving suitable course content when planning web-based courses. A training management component of LMS 140 may help the training administrator 105 plan and create the course offering; manage participation, resources, and courses; and perform reporting. When planning e-learning courses, the training administrator 105 uses references inserted in published courses to retrieve the appropriate content in the content management system for the courses being planned. Content management system 220 may also include or implement content conversion, import, and export functions, allowing easy integration of Sharable Content Object Reference Model (SCORM)-compliant courses from external providers or other content providers 108. Customers can create and save their own templates for the various learning elements (learning objects, tests, and so on) that define structural and content-related specifications. These provide authors with valuable methodological and didactical support.

Figure 3:
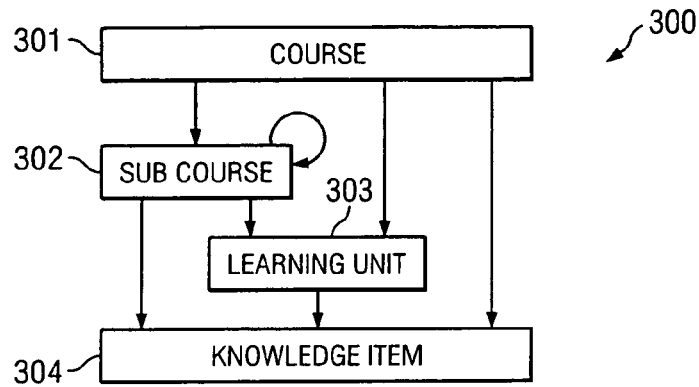
FIG. 3 illustrates an example content aggregation model in the learning management system.

The LMS 140 and its implemented methodology typically structure content so that the content is reusable and flexible. For example, the content structure allows the creator of a course to reuse existing content to create new or additional courses. In addition, the content structure provides flexible content delivery that may be adapted to the learning styles of different learners. E-learning content may be aggregated using a number of structural elements arranged at different aggregation levels. Each higher level structural element may refer to any instances of all structural elements of a lower level. At its lowest level, a structural element refers to content and may not be further divided. According to one implementation shown in FIG. 3, course material 300 may be divided into four structural elements: a course 301, a sub-course 302, a learning unit 303, and a knowledge item 304.

Starting from the lowest level, knowledge items 304 are the basis for the other structural elements and are the building blocks of the course content structure. Each knowledge item 304 may include content that illustrates, explains, practices, or tests an aspect of a thematic area or topic. Knowledge items 304 typically are small in size (i.e., of short duration, e.g., approximately five minutes or less). Any number of attributes may be used to describe a particular knowledge item 304 such as, for example, a name, a type of media, and a type of knowledge. The name may be used by a learning system to identify and locate the content associated with a knowledge item 304. The type of media describes the form of the content that is associated with the knowledge item 304. For example, media types include a presentation type, a communication type, and an interactive type. A presentation media type may include a text, a table, an illustration, a graphic, an image, an animation, an audio clip, and a video clip. A communication media type may include a chat session, a group (e.g., a newsgroup, a team, a class, and a group of peers), an email, a short message service (SMS), and an instant message. An interactive media type may include a computer based training, a simulation, and a test.

Knowledge item 304 also may be described by the attribute of knowledge type. For example, knowledge types include knowledge of orientation, knowledge of action, knowledge of explanation, and knowledge of source/reference. Knowledge types may differ in learning goal and content. For example, knowledge of orientation offers a point of reference to the learner, and, therefore, provides general information for a better understanding of the structure of interrelated structural elements. Each of the knowledge types are described in further detail below.

Knowledge items 304 may be generated using a wide range of technologies, often allowing a browser (including plug-in applications) to be able to interpret and display the appropriate file formats associated with each knowledge item. For example, markup languages (such as HTML, a standard generalized markup language (SGML), a dynamic HTML (DHTML), or XML), JavaScript (a client-side scripting language), and/or Flash may be used to create knowledge items 304. HTML may be used to describe the logical elements and presentation of a document, such as, for example, text, headings, paragraphs, lists, tables, or image references. Flash may be used as a file format for Flash movies and as a plug-in for playing Flash files in a browser. For example, Flash movies using vector and bitmap graphics, animations, transparencies, transitions, MP3 audio files, input forms, and interactions may be used. In addition, Flash allows a pixel-precise positioning of graphical elements to generate impressive and interactive applications for presentation of course material to a learner.

Learning units 303 may be assembled using one or more knowledge items 304 to represent, for example, a distinct, thematically-coherent unit. Consequently, learning units 303 may be considered containers for knowledge items 304 of the same topic. Learning units 303 also may be considered relatively small in size (i.e., duration) though larger than a knowledge item 304.

Sub-courses 302 may be assembled using other sub-courses 302, learning units 303, and/or knowledge items 304. The sub-course 302 may be used to split up an extensive course into several smaller subordinate courses. Sub-courses 302 may be used to build an arbitrarily deep nested structure by referring to other sub-courses 302.

Courses may be assembled from all of the subordinate structural elements including sub-courses 302, learning units 303, and knowledge items 304. To foster maximum reuse, all structural elements should be self-contained and context free.

Structural elements also may be tagged with metadata that is used to support adaptive delivery, reusability, and search/retrieval of content associated with the structural elements. For example, learning object metadata (LOM) defined by the IEEE "Learning Object Metadata Working Group" may be attached to individual course structure elements. The metadata may be used to indicate learner competencies associated with the structural elements. Other metadata may include a number of knowledge types (e.g., orientation, action, explanation, and resources) that may be used to categorize structural elements.

Figure 4:
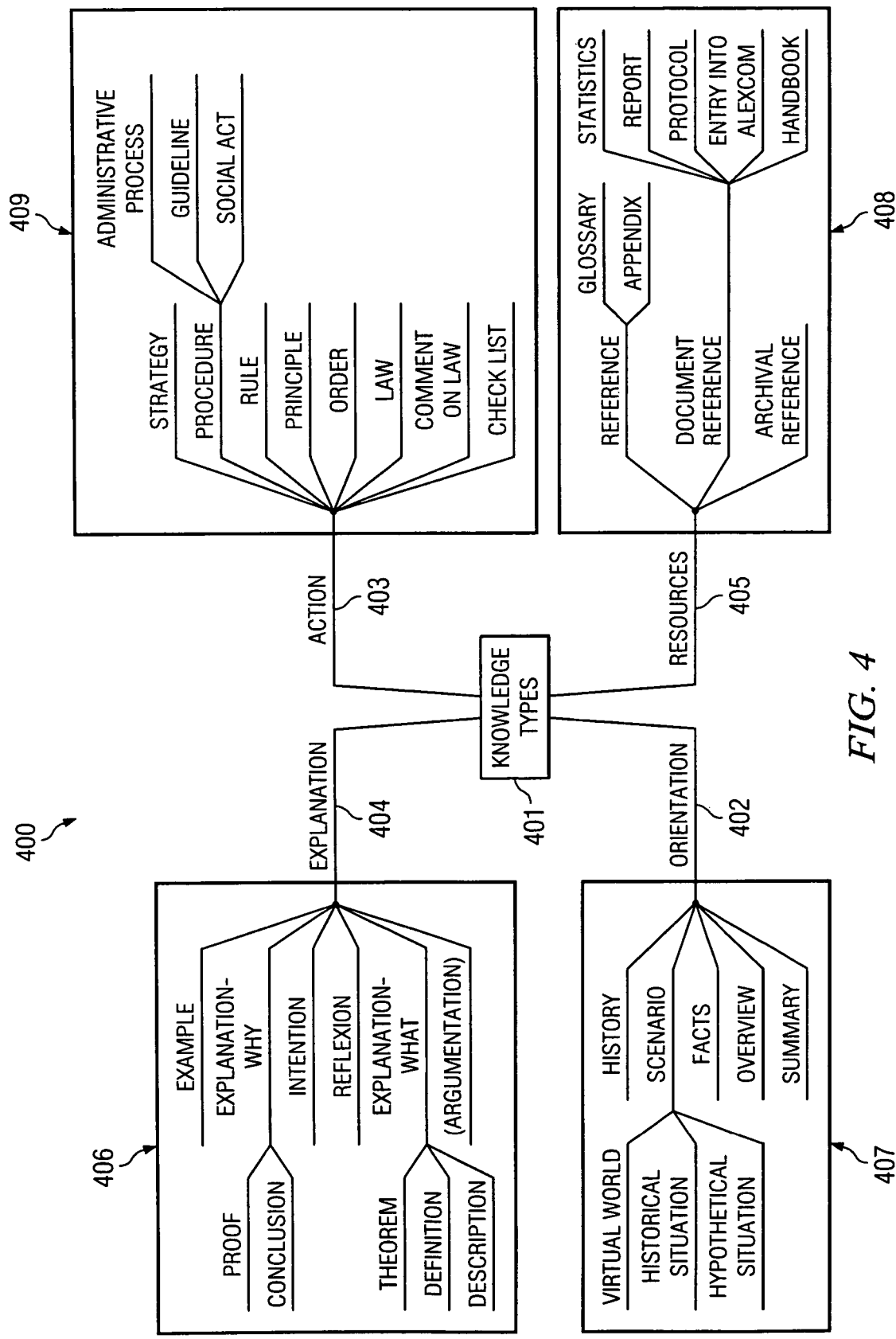
FIG. 4 is an example of one possible ontology of knowledge types used in the learning management system.

As shown in FIG. 4, structural elements may be categorized using a didactical ontology 400 of knowledge types 401 that includes orientation knowledge 402, action knowledge 403, explanation knowledge 404, and resource knowledge 405. Orientation knowledge 402 helps a learner 104 to find their way through a topic without being able to act in a topic-specific manner and may be referred to as "know what." Action knowledge 403 helps a learner to acquire topic related skills and may be referred to as "know how." Explanation knowledge 404 provides a learner with an explanation of why something is the way it is and may be referred to as "know why." Resource knowledge 405 teaches a learner where to find additional information on a specific topic and may be referred to as "know where."

The four knowledge types (orientation, action, explanation, and reference) may be further divided into a fine grained ontology. For example, orientation knowledge 402 may refer to sub-types 407 that include a history, a scenario, a fact, an overview, and a summary. Action knowledge 403 may refer to sub-types 409 that include a strategy, a procedure, a rule, a principle, an order, a law, a comment on law, and a checklist. Explanation knowledge 404 may refer to sub-types 406 that include an example, an intention, a reflection, an explanation of why or what, and an argumentation. Resource knowledge 405 may refer to sub-types 408 that include a reference, a document reference, and an archival reference.

Dependencies between structural elements may be described by relations when assembling the structural elements at one aggregation level. A relation may be used to describe the natural, subject-taxonomic relation between the structural elements. A relation may be directional or non-directional. A directional relation may be used to indicate that the relation between structural elements is true only in one direction. Directional relations should be followed. Relations may be divided into two categories: subject-taxonomic and non-subject taxonomic.

Subject-taxonomic relations may be further divided into hierarchical relations and associative relations. Hierarchical relations may be used to express a relation between structural elements that have a relation of subordination or superordination. For example, a hierarchical relation between the knowledge items A and B exists if B is part of A. Hierarchical relations may be divided into two categories: the part/whole relation (i.e., "has part") and the abstraction relation (i.e., "generalizes"). For example, the part/whole relation "A has part B" describes that B is part of A. The abstraction relation "A generalizes B" implies that B is a specific type of A (e.g., an aircraft generalizes a jet or a jet is a specific type of aircraft).

Associative relations may be used refer to a kind of relation of relevancy between two structural elements. Associative relations may help a learner obtain a better understanding of facts associated with the structural elements. Associative relations describe a manifold relation between two structural elements and are mainly directional (i.e., the relation between structural elements is true only in one direction). Examples of associative relations include "determines," "side-by-side," "alternative to," "opposite to," "precedes," "context of," "process of" "values," "means of," and "affinity."

The "determines" relation describes a deterministic correlation between A and B (e.g., B causally depends on A). The "side-by-side" relation may be viewed from a spatial, conceptual, theoretical, or ontological perspective (e.g., A side-by-side with B is valid if both knowledge objects are part of a superordinate whole). The side-by-side relation may be sub-divided into relations, such as "similar to," "alternative to," and "analogous to." The "opposite to" relation implies that two structural elements are opposite in reference to at least one quality. The "precedes" relation describes a temporal relationship of succession (e.g., A occurs in time before B (and not that A is a prerequisite of B). The "context of" relation describes the factual and situational relationship on a basis of which one of the related structural elements may be derived. An "affinity" between structural elements suggests that there is a close functional correlation between the structural elements (e.g., there is an affinity between books and the act of reading because reading is the main function of books).

Non Subject-Taxonomic relations may include the relations "prerequisite of" and "belongs to." The "prerequisite of" and the "belongs to" relations do not refer to the subject-taxonomic interrelations of the knowledge to be imparted. Instead, these relations refer to the progression of the course in the learning environment (e.g., as the learner traverses the course). The "prerequisite of" relation is directional whereas the "belongs to" relation is non-directional. Both relations may be used for knowledge items 304 that cannot be further subdivided. For example, if the size of the screen is too small to display the entire content on one page, the page displaying the content may be split into two pages that are connected by the relation "prerequisite of."

Another type of metadata is competencies. Competencies may be assigned to structural elements, such as, for example, a sub-course 302 or a learning unit 303. The competencies may be used to indicate and evaluate the performance of a learner as learner 104 traverses the course material. A competency may be classified as a cognitive skill, an emotional skill, a senso-motorical skill, or a social skill.

Figure 5A:
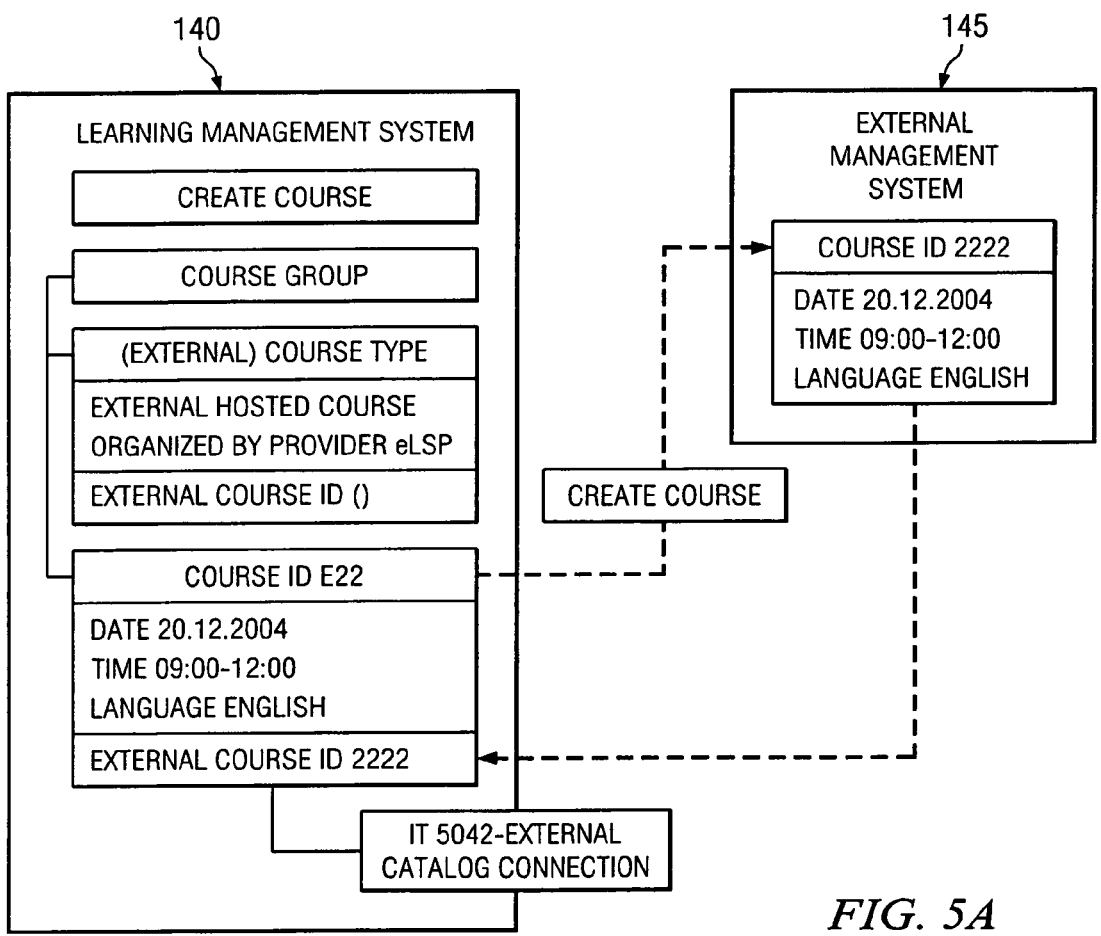
FIGS. 5A-C illustrate example schematics for creating external courses, updating external course, and deleting external courses, respectively.
Figure 5B:
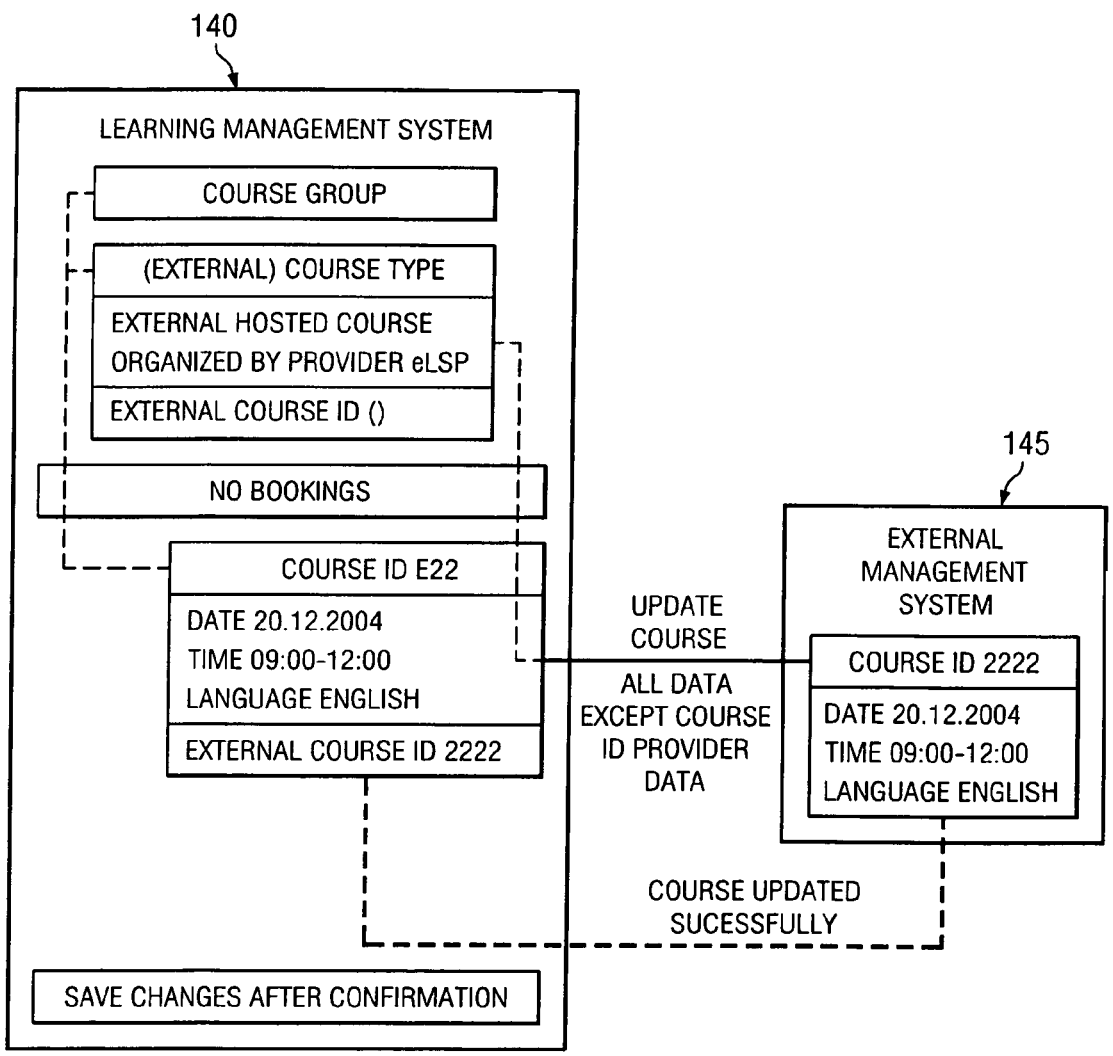
Figure 5C:
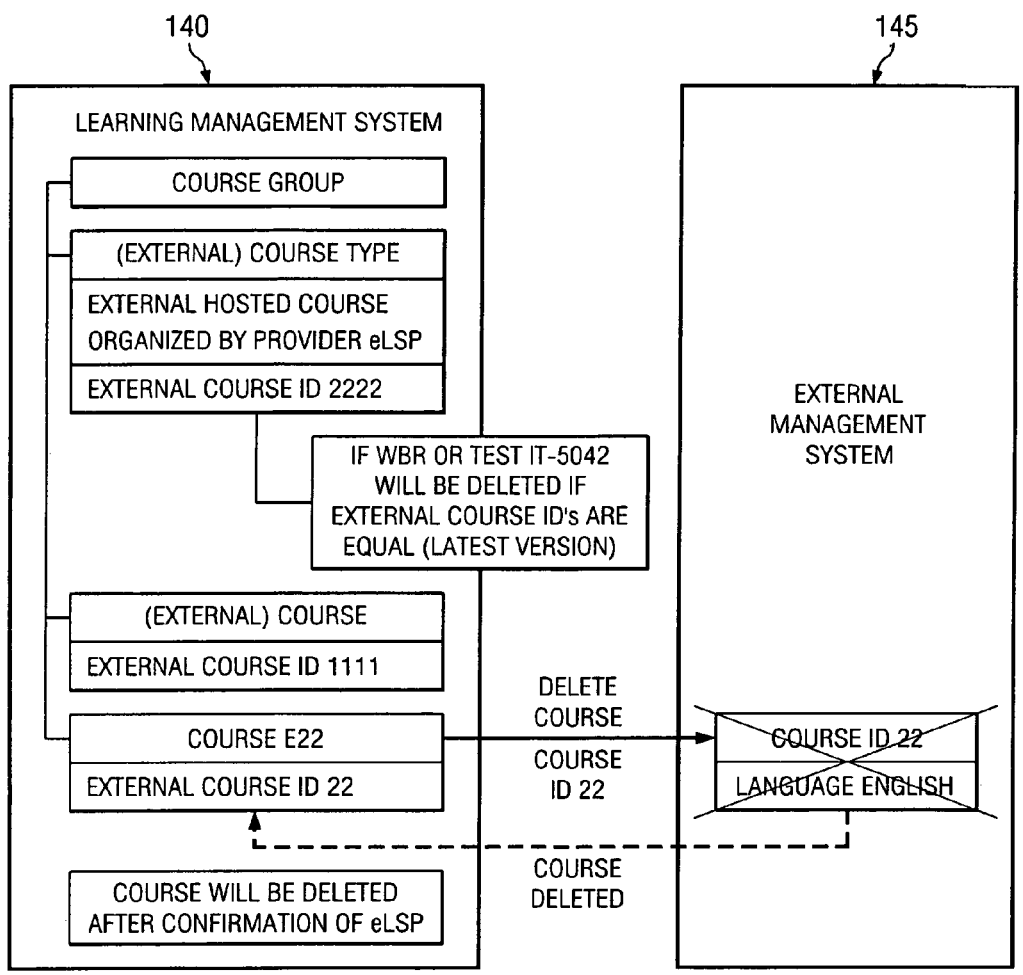

FIGS. 5A-C illustrate example diagrams for creating an external course, updating an external course, and deleting an external course, respectively. Of course, FIGS. 5A-C are for illustration purposes only and other schematic diagrams may be used to illustrate similar processes.

Referring to FIG. 5A, internal or local learning management system 140 identifies a course type in course catalog 142. Learning management system 140 may identify the course type in response to a selection from a user or learner 104. Based, at least in part, on the identified course type, learning management system 140 identifies external management system 145. For example, learning management system 140 may determine that external management system 145 provides Calculus courses and, as a result, identifies a network address associated with external management system 145. After identifying external management system 145, learning management system 140 transmits a creation request to external management system 145 to determine if the course type has been created in external course catalog 142b or create such a course if not exists. The creation request may include a request for an external course ID. External management system 145 identifies an external course using the course type and associated aspects. For example, the aspects may include a date, time, course ID, delivery method, or other aspects. After identifying the external course, external management system 145 transmits a confirmation message to learning management system 140. The confirmation message may include information associated with the external course such as aspects discussed above. In response to the confirmation message, learning management system 140 generates the course and integrates the external course in internal course catalog 142a.

Referring to FIG. 5B, local learning management system 140 receives a request to update the external course. For example, the request may be a command or a query to reschedule the external course, change the location, or other suitable updates. Learning management system 140 may identify external management system 145 using information stored in or referenced in the internal course catalog 142a. A network address for external management system 145 may also be identified. Learning management system 140 transmits an update request to external management system 145. In response to at least the update request, external management system 145 updates the external course in external course catalog 142b. In the illustrated example, external management system 145 updates the date and time of the course. After the update is complete, external management system 145 may transmit a confirmation message to learning management system 140 indicating that the external course catalog 142b has been updated. Learning management system 140 updates the external course in the internal course catalog 142a in accordance with the updates.

Referring to FIG. 5C, learning management system 140 receives a request to delete the external course. Learning management system 140 may identify external management system 145 using any of the example techniques or data structures mentioned above. Learning management system 140 transmits a delete request to external management system 145. In response to the delete request, external management system 145 deletes the external course from external course catalog 142b. After the deletion, external management system 145 may transmit a confirmation message to learning management system 140 indicating that the external course catalog 142b has been deleted. Upon receipt of the confirmation message, learning management system 140 deletes the external course from the internal course catalog 142a.

Figure 6:
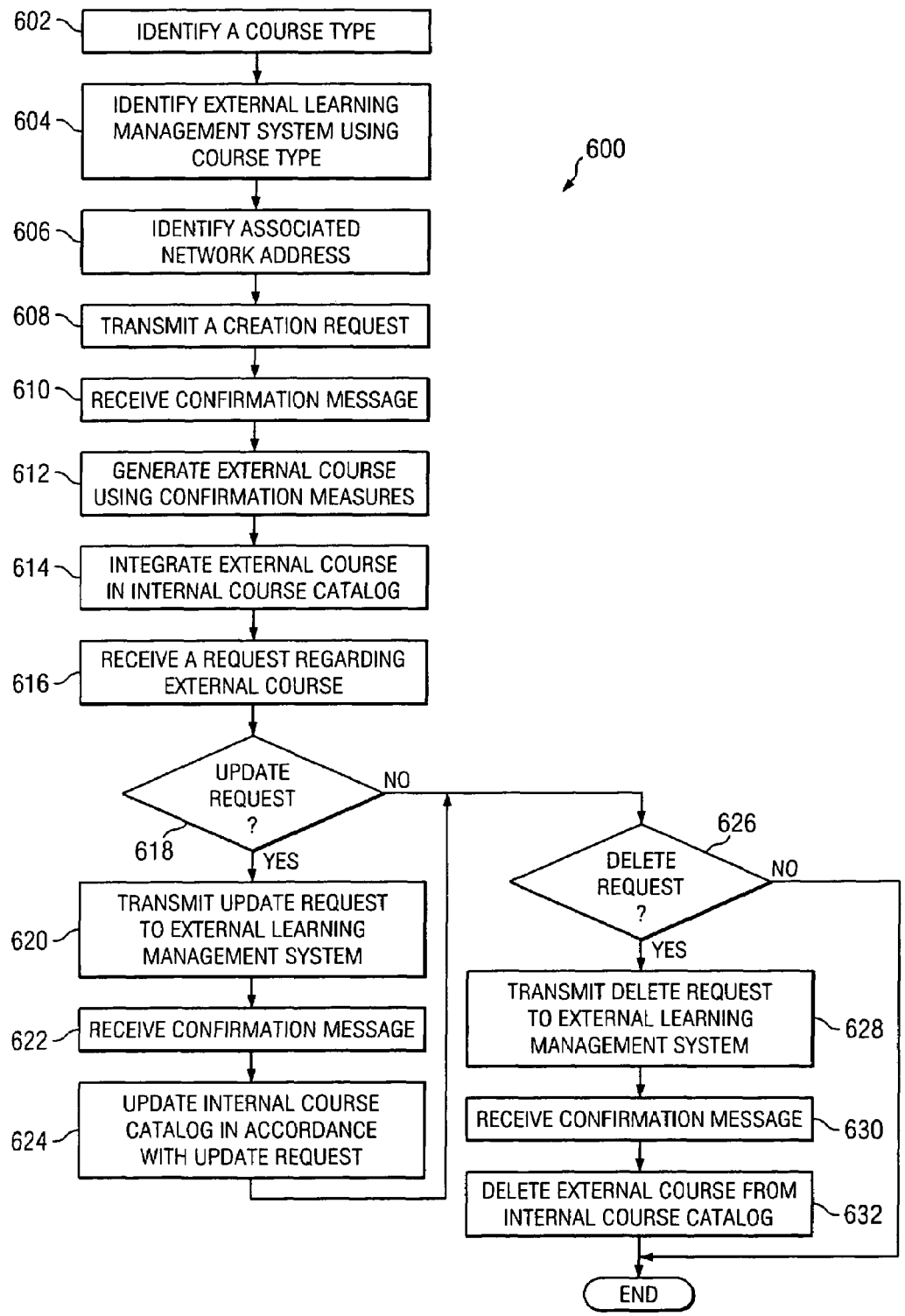
FIG. 6 illustrates an example method for managing external course in an internal course catalog.

FIG. 6 is a flow diagram illustrating an example method 600 for managing information in environment 100. Method 600 is described with respect to certain portions of environment 100 of FIG. 1, but method 600 could be used by any other device or components. Moreover, environment 100 may use other suitable techniques for performing these tasks. Thus, many of the steps in this flowchart may take place simultaneously and/or in different orders as shown. Environment 100 may also use methods with additional steps, fewer steps, and/or different steps, so long as the methods remain appropriate.

At a high lev el, method 600 includes two processes: integrating an external course in internal course catalog 142a and performing an operation on the integrated external course. The example integration process is illustrated in steps 602 to 614. The example operation process is illustrated in steps 616 to 632. Method 600 begins at step 602, where learning management system 140 identifies a course type in the internal course catalog 142a. The course type may be identified in response to a request, a selection by user, or any other suitable event. For example, learner 104 may select Vector Calculus as the course type. Learning management system 140 identifies external management system 145 using the identified course type at step 604. In the example, learning management system 140 may determine that external management system 145 provides Calculus courses such as Vector Calculus. At step 606, learning management system 140 identifies a network address or other logical identifier for external management system 145. For example, the network address may be an IP address. Next, at step 608, learning management system 104 transmits a creation request to external management system 145 to determine if external course catalog 142b the includes a course of the particular course type. In the Calculus example, learning management system 104 transmits to external management system 145 a request to determine if external course catalog 142b includes a Vector Calculus course. At step 610, internal learning management system 104a receives a confirmation message indicating that external course catalog 140b includes an external course of the course type or create such a course in external course catalog 140b if not exists. In response to the confirmation message, learning management system 104 generates the external course using the confirmation message at step 612. Turning again to the Calculus example, learning management system 104 may generate the external course including a location, schedule, or other aspects of the Vector Calculus course. Learning management system 104 integrates the external course into internal course catalog 142a at step 614.

With respect to the example operation process, learning management system 104 receives a request involving the external course at step 616. If the request is an update request at decisional step 618, then, at step 620, learning management system 104 transmits an update request to external management system 145. The update request may include information that that identifies the particular update to apply to the external course. In the Calculus example, the update request may identify a new textbook for learners to purchase instead of a previously identified textbook. At step 622, learning management system 104 receives a confirmation message indicating that the update has been applied to the external course in external catalog 142b. In response to the confirmation message, learning management system 104 updates the external course in internal course catalog 142a in accordance with the update request. But as shown, the request is a delete request at decisional step 626, then, at step 628, learning management system 104 transmits a delete request compatible with external learning management system 145 to delete the external course from external catalog 142b. At step 630, learning management system 104 receives a confirmation message indicating that the external course has been deleted from external course catalog 142b. In response to the confirmation message, learning management system 104 then deletes the external course from internal course catalog 142b.

Although this disclosure has been described in terms of certain embodiments and generally associated methods, alternatives and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method, comprising:
    identifying a course type in an internal course catalog, wherein the internal course catalog identifies courses managed by a local learning management system and enables users to enroll in one or more of the courses managed by the local learning management system;
    transmitting a request for an external course that is associated with the course type and referenced in a remote course catalog to a remote learning management system, wherein the remote learning management system manages a plurality of external courses and is accessible by a plurality of different local learning management systems;
    receiving information associated with the external course from the remote learning management system, wherein the received information identifies at least a delivery method of the external course to allow a user of the local management system access to the external course provided by the remote learning management system; and
    automatically updating the internal catalog with the external course using the received information such that users may select the external course from the up dated internal course catalog and enroll in the external course managed by the remote learning management system.

2. The method of claim 1, further comprising identifying the remote learning management system based, at least in part, on the identified course type.

3. The method of claim 1, wherein identifying a course type comprises receiving a selection of the course type by a learner through a Graphical User Interface.

4. The method of claim 1, the course type including information operable to identity a logical identifier of the remote learning management system, wherein the request is transmitted to the remote learning management system using the logical identifier.

5. The method of claim 1, the internal course catalog is stored in a first format, the remote course catalog stored in a second format, the method further comprising converting information in the second format to the first format.

6. The method of claim 1, further comprising:
transmitting a second request to update the external course to the remote learning management system;
receiving a confirmation that the external course was updated at the remote learning management system; and
automatically updating the external course in the internal course catalog based, at least in part, on the confirmation.

7. The method of claim 6, the updated course comprising the external course scheduled at a different time.

8. The method of claim 1, further comprising:
transmitting a request to delete the external course to the remote learning management system;
receiving a confirmation that the external course was deleted at the remote learning management system; and
automatically deleting the external course from the internal course catalog based, at least in part, on the confirmation.

9. Software for managing courses comprising computer readable instructions embodied on media and operable to:
identify a course type in an internal course catalog, wherein the internal course catalog identifies courses managed by a local learning management system and enables users to enroll in one or more of the courses managed by the local learning management system;
transmit a request for an external course that is associated with the course type and referenced in a remote course catalog to a remote learning management system, wherein the remote learning management system manages a plurality of external courses and is accessible by a plurality of different local learning management systems;
receive information associated with the external course from the remote learning management system, wherein the received information identifies at least a delivery method of the external course to allow a user of the local management system access to the external course provided by the remote learning management system; and
automatically update the internal catalog with the external course using the received information such that users may select the external course from the updated internal course catalog and enroll in the external course managed by the remote learning management system.

10. The software of claim 9, farther operable to identify the remote learning management system based, at least in part, on the identified course type.

11. The software of claim 9, wherein the software operable to identify a course type comprises the software operable to receive a selection of the course type by a learner through a Graphical User Interface.

12. The software of claim 9, the course type including information operable to identity a logical identifier of the remote learning management system, wherein the request is transmitted to the remote learning management system using the logical identifier.

13. The software of claim 9, the internal course catalog is stored in a first format, the remote course catalog stored in a second format, the software further operable to convert information in the second format to the first format.

14. The software of claim 9, further operable to:
transmit a second request to update the external course to the remote learning management system;
receive a confirmation that the external course was updated at the remote learning management system; and
automatically update the external course in the internal course catalog based, at least in part, on the confirmation.

15. The software of claim 14, the updated course comprising the external course scheduled at a different time.

16. The software of claim 9, further operable to:
transmit a request to delete the external course to the remote learning management system;
receive a confirmation that the external course was deleted at the remote learning management system; and
automatically delete the external course from the internal course catalog based, at least in part, on the confirmation.

17. A system, comprising:
memory operable to store an internal course catalog; and
one or more processors operable to:
identify a course type in the internal course catalog, wherein the internal course catalog identifies courses managed by a local learning management system and enables users to enroll in one or more of the courses managed by the local learning management system;
transmit a request for an external course that is associated with the course type and referenced in a remote course catalog to a remote learning management system, wherein the remote learning management system manages a plurality of external courses and is accessible by a plurality of different local learning management systems;
receive information associated with the external course from the remote learning management system, wherein the received information identifies at least a delivery method of the external course to allow a user of the local management system access to the external course provided by the remote learning management system; and
automatically up date the internal catalog with the external course using the received information such that users may select the external course from the updated internal course catalog and enroll in the external course managed by the remote learning management system.

18. The system of claim 17, the processors farther operable to identify the remote learning management system based, at least in part, on the identified course type.

19. The system of claim 17, wherein the processors operable to identify a course type comprises the processors operable to receive a selection of the course type by a learner through a Graphical User Interface.

20. The system of claim 17, the course type including information operable to identity a logical identifier of the remote learning management system, wherein the request is transmitted to the remote learning management system using the logical identifier.

21. The system of claim 17, the internal course catalog is stored in a first format, the remote course catalog stored in a second format, the processors further operable to convert information in the second format to the first format.

22. The system of claim 17, the processors further operable to:
- transmit a second request to update the external course to the remote learning management system;
- receive a confirmation that the external course was updated at the remote learning management system; and
- automatically update the external course in the internal course catalog based, at least in part, on the confirmation.

23. The system of claim 22, the updated course comprising the external course scheduled at a different time.

24. The system of claim 17, the processors further operable to:
- transmit a request to delete the external course to the remote learning management system;
- receive a confirmation that the external course was deleted at the remote learning management system; and
- automatically delete the external course from the internal course catalog based, at least in part, on the confirmation.

25. A system, comprising:
- means for identifying a course type in an internal course catalog, wherein the internal course catalog identifies courses managed by a local learning management system and enables users to enroll in one or more of the courses managed by the local learning management system;
- means for transmitting a request for an external course that is associated with the course type and referenced in a remote course catalog to a remote learning management system, wherein the remote learning management system manages a plurality of external courses and is accessible by a plurality of different local learning management systems;
- means for receiving information associated with the external course from the remote learning management system, wherein the received information identifies at least a delivery method of the external course to allow a user of the local management system access to the external course provided by the remote learning management system; and
- means for automatically updating the internal catalog with the external course using the received information such that users may select the external course from the updated internal course catalog and enroll in the external course managed by the remote learning management system.

* * * * *